United States Patent [19]

Campbell et al.

[11] Patent Number: 4,647,719
[45] Date of Patent: Mar. 3, 1987

[54] TERMINATION CLOSURE FOR BURIED SERVICE CABLES AND METHODS OF INSTALLING

[75] Inventors: Eric R. Campbell, Atlanta; Joe B. Moss, Lawrenceville; Francis J. Mullin, Chamblee; William C. Reed, Lilburn, all of Ga.

[73] Assignees: AT&T Technologies, Inc., Berkeley Heights; AT&T Bell Laboratories, Murray Hill, both of N.J.

[21] Appl. No.: 747,487

[22] Filed: Jun. 21, 1985

[51] Int. Cl.⁴ ............................................ H02G 15/08
[52] U.S. Cl. ........................................ 174/93; 156/48; 156/49; 174/76; 174/78; 174/88 R
[58] Field of Search ............... 174/76, 78, 88 R, 92, 174/93; 156/48, 49

[56] References Cited

U.S. PATENT DOCUMENTS

| | | | |
|---|---|---|---|
| 1,762,255 | 6/1930 | Baldwin . | |
| 1,815,706 | 7/1931 | Del Mar . | |
| 2,437,358 | 3/1948 | Mowery | 174/92 |
| 2,509,929 | 5/1950 | Kleinfelder et al. . | |
| 2,998,840 | 9/1961 | Davis . | |
| 3,377,422 | 4/1968 | Trimble et al. | 174/88 R |
| 3,499,972 | 3/1970 | Smith | 174/78 |
| 3,636,241 | 1/1972 | Baumgartner et al. | 174/88 R X |
| 3,701,835 | 10/1972 | Eisele et al. | 174/92 X |
| 3,715,459 | 2/1973 | Hoffman | 174/92 X |
| 3,770,871 | 11/1973 | Goodman | 174/11 R |
| 3,781,461 | 12/1973 | Thompson et al. | 174/93 |
| 3,823,254 | 7/1974 | Smith | 174/92 |
| 3,879,574 | 4/1975 | Filreis et al. | 174/76 |
| 3,984,623 | 10/1976 | Worden | 174/93 X |
| 3,992,569 | 11/1976 | Hankins et al. | 174/92 |
| 4,015,072 | 3/1977 | Gillemot | 174/93 X |
| 4,292,099 | 9/1981 | Dinger | 156/49 |
| 4,314,092 | 2/1982 | Fleming et al. | 156/49 X |
| 4,347,402 | 8/1982 | Reyners | 174/91 |
| 4,358,634 | 11/1982 | Dienes | 174/88 R |
| 4,376,231 | 3/1983 | Sabia et al. | 174/92 |
| 4,419,156 | 12/1983 | Diaz et al. | 156/49 |
| 4,499,129 | 2/1985 | Kridl et al. | 174/92 X |

FOREIGN PATENT DOCUMENTS 1558657 1/1980 United Kingdom ............. 174/88 R

OTHER PUBLICATIONS

Mullin-Reed, Appl. Ser. No. 619,266, filed Jun. 11, 1984.
Kleinfelder, W. C., "A New Cable Splice Closure", Bell Laboratories Record, Nov. 1954, p. 405.

Primary Examiner—Arthur T. Grimley
Assistant Examiner—Morris H. Nimmo
Attorney, Agent, or Firm—E. W. Somers

[57] ABSTRACT

A termination closure (20) for buried or underground service cable splice locations includes molded stepped end blocks (40—40) and a cover (100) which comprises a sheet adapted to be wrapped about service cables (28—28) having conductors (26—26) which are spliced to conductors (24—24) of a distribution cable (22) and secured by clamps. The closure also includes a pivotally mounted organizer (80) which is perforated to allow an encapsulant to be flowed therethrough into engagement with an enclosing bladder (90). The organizer effectively isolates splice connections from the distribution cable core (23). The bladder which is wrapped about the organizer is adapted to receive encapsulant from a tube which extends through one of the end blocks to allow it to be flowed into the interstices among the spliced conductors and distribution cable core. Air in the closure is pushed from one end of the closure and evacuated through a relief valve (59) in the other end block. The relief valve is arranged so that an indicator thereof is not moved outwardly to provide a visual indication until the closure has been filled properly.

27 Claims, 15 Drawing Figures

TERMINATION CLOSURE FOR BURIED SERVICE CABLES AND METHODS OF INSTALLING

TECHNICAL FIELD

This invention relates to a termination closure for buried service cables and to methods of installing. More particularly, it relates to a cable termination closure which is adapted to be assembled in a manner which accommodates a range of cable sizes and which includes provisions for organizing conductors and cables within the closure.

BACKGROUND OF THE INVENTION

When two or more cables such as telecommunications cables are spliced together, the splice area is ordinarily housed within a protective cover known as a closure. Such closures often have included cylindrical covers with one or more longitudinal joints and end blocks that surround incoming and outgoing cables and that form seals with the covers. An example of a prior art closure is shown in U.S. Pat. No. 3,636,241 which issued on Jan. 18, 1972 in the names of R. B. Baumgartner et al. Closures which are effective in providing protection for the splice connections are available in the marketplace, but in many instances their assembly is relatively time consuming, often requiring specialized tools and equipment which in a limited space such as a narrow trench are difficult to handle and operate. Also, because of the number of different size cables in the field, a user must inventory a corresponding number of different size closures.

Common to substantially all closures is the requirement that they restrict moisture ingress. The integrity of systems which are used to restrict moisture ingress is important especially because of transmission parameters which are readily affected by changes in the moisture content within the cable. Water can enter a splice area through an enclosure imperfection or through one of the cables, in the latter case travelling from a point of damaged cable sheathing, along the conductor core, to the connections between the spliced conductors.

Various systems are used in available closures for providing a waterproof closure. To prevent the ingress of moisture, some systems employ dry air, nitrogen or a similar chemically inert gas in the cables and closures. In this type of closure, the gas is pressurized to create a flow from enclosed equipment through any openings and prevent the ingress of moisture. In the recent past, closures have been filled with a curable, liquid encapsulant to provide moisture protection or sealed in ways other than with pressurized gas. For example, another commonly used closure includes a heat shrinkable sleeve.

Not infrequently, due to line failure or routine maintenance, one or more newly installed cables must be joined or some of the conductors are rejoined to others. Thus the reentry of and the effective resealing of the closure becomes necessary. Accordingly, the reentry of the closure and its resealing should be made as easy as possible. The reentry of some prior art closures that are filled with a waterproofing material is a time-consuming task for a craftperson.

In one prior art system, a plastic liner is placed around the splice area and secured to the cables, thereby forming an enclosure into which liquid encapsulant is poured. The encapsulant, which is at ambient pressure, flows to displace most of the air within the closure, but, being relatively viscous, does not penetrate far, if at all, into the end portions of the cables. The encapsulant in the closure is pressurized to some degree by wrapping ties, tape or the like, around the closure. In such a system, any encapsulant volume change subsequent to the wrapping leads to a change in pressure. These shortcomings tend to impair the effectiveness of the encapsulant in protecting the connections between the spliced conductors from moisture.

In application Ser. No. 619,266 filed on June 11, 1984, in the names of F. J. Mullin and W. C. Reed, a sheet of an elastomeric material in the form of a bladder is adapted to envelop spliced conductors, and to provide containment for a liquid encapsulant at a pressure that is substantially greater than ambient pressure. The bladder is enclosed in a substantially rigid enclosure, which serves to protect the bladder as well as to limit the expansion of the bladder under pressure. Filling the bladder with liquid encapsulant and controlling the pressurizing of the encapsulant ensures the formation of a substantial layer of encapsulant between the spliced conductors and the walls of the bladder, and urges encapsulant into voids and for some distance into the cable core at each end of the closure. Should enough encapsulant penetrate into the cables to cause a drop of pressure within the containment bladder, additional encapsulant can be pumped into the bladder, thereby increasing the pressure again to the desired level, and restoring encapsulant to a volumetric level which is sufficient to protect the splice connections.

The containment facilities in the above-disclosed application are adapted to maintain the pressure for a time sufficient for at least a part of the encapsulant to solidify. The arrangement results in the provision of an effective gasket because the encapsulant cures while pressurized and under a compressive load. Many cables comprise materials with which it is difficult or impossible to form an adhesive bond. Compressively loaded, cured encapsulant, urged against any surface it contacts, resists water intrusion along surfaces with which the encapsulant does not form an adhesive bond.

Although the just-described system is an improvement over prior art systems, provisions are needed for an easy-to-assemble closure which includes the containment bladder. Inasmuch as encapsulation is widely used to waterproof closures, especially in the telecommunications industry, a system that is convenient, reenterable, economical and effective in protecting splice connections from moisture to prevent transmission faults would be of considerable interest. Further, the sought-after closure desirably should include facilities for isolating the splice connections from the cable core along which water ingresses the closure.

What is needed and what the prior art seemingly does not include is an easily assembled, reenterable closure adapted to receive an encapsulant. The closure should comprise a relatively small number of components and be assembled easily about splice connections involving different size distribution cables and buried service cables. Such a closure is desirable where future changes will be required in splice connections. It does not appear that the prior art includes such a relatively inexpensive, reliable closure which is assembled readily in the field and which includes provisions for the controlled pressurization of the encapsulant.

SUMMARY OF THE INVENTION

The foregoing problems have been overcome by the closure of this invention. The closure includes first and second end blocks which are spaced apart and adapted to have cables extending therethrough into the closure where conductors of the cables are spliced together to provide connections therebetween. Also, the closure includes an organizer which is disposed between the end blocks and which has a portion disposed between the connections and conductor portions of at least one cable core. The organizer isolates the connections and conductor portions adjacent to the connections from the conductor portions of the at least one cable core and encloses separately the connections and adjacent conductor portions in one zone and the conductor portions of the at least one cable core in another zone. The closure also includes facilities for enclosing the organizer and portions of the end blocks and being adapted to contain a curable, liquid encapsulant which is introduced into the closure. In a preferred embodiment, a bladder encloses the organizer and is secured about the end blocks to contain a pressurized encapsulant which is introduced into the closure. A cover encloses the bladder and provides a surface against which the bladder is expanded when encapsulant is introduced into the closure. Provisions are made for evacuating air from within the bladder to insure that the bladder is filled substantially completely with the encapsulant.

More particularly, a termination closure for protecting splice connections between a distribution cable and buried service cables is adapted to be filled with an encapsulant to waterproof the closure and includes stepped end blocks and a cover which comprises a sheet of plastic material adapted to be wrapped helically about the spliced portions of the cables. Because the cover is wrapped helically about the cables and end blocks, it is capable of being used to enclose a number of different size end blocks which can accommodate different cable sizes and splices. Also, the closure includes an organizer which is perforated to allow the encapsulant to be flowed through it to fill substantially completely the closure. Further, the organizer is provided with a plurality of projections on an outer surface thereof to maintain it spaced from an enclosing bladder to allow encapsulant to be moved between the organizer and the bladder. The organizer is adapted to be mounted pivotally on a bonding wire which extends between bonding clamps at opposite ends of an exposed length of the core of the distribution cable. The organizer includes a tray portion which separates the cable core from the splice connections. Also, the organizer includes portions which enclose separately the distribution cable core and the splice connections.

In a method of installing the closure, a portion of the sheath system at an intermediate location along a distribution cable and that of end portions of service cables are removed and the cables grounded through bonding clamps. Conductors of the service cables are spliced to conductors of the distribution cable and an organizer is mounted in position pivotally about the bonding wire which extends between the bonding clamps to cause the distribution cable core and splice connections to be disposed on opposite sides of a tray portion of the organizer. Then the organizer is wrapped with ties and stepped end blocks positioned at opposite ends of the splice location. A bladder is wrapped about the organizer and secured about smaller diameter portions of the end blocks. The bladder is adapted to receive encapsulant to allow it to be flowed into the interstices about the spliced conductors and the core of the distribution cable. In a next step, a cover is wrapped helically about the organizer and secured about large diameter portions of the end blocks. Afterwards, encapsulant is flowed into the closure through a tube in one of the end blocks. Air in the closure is evacuated through a relief valve in one end block. Advantageously, the relief valve is arranged so that a portion thereof is adapted to be moved outwardly to provide a visual indication when the closure has been filled properly.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
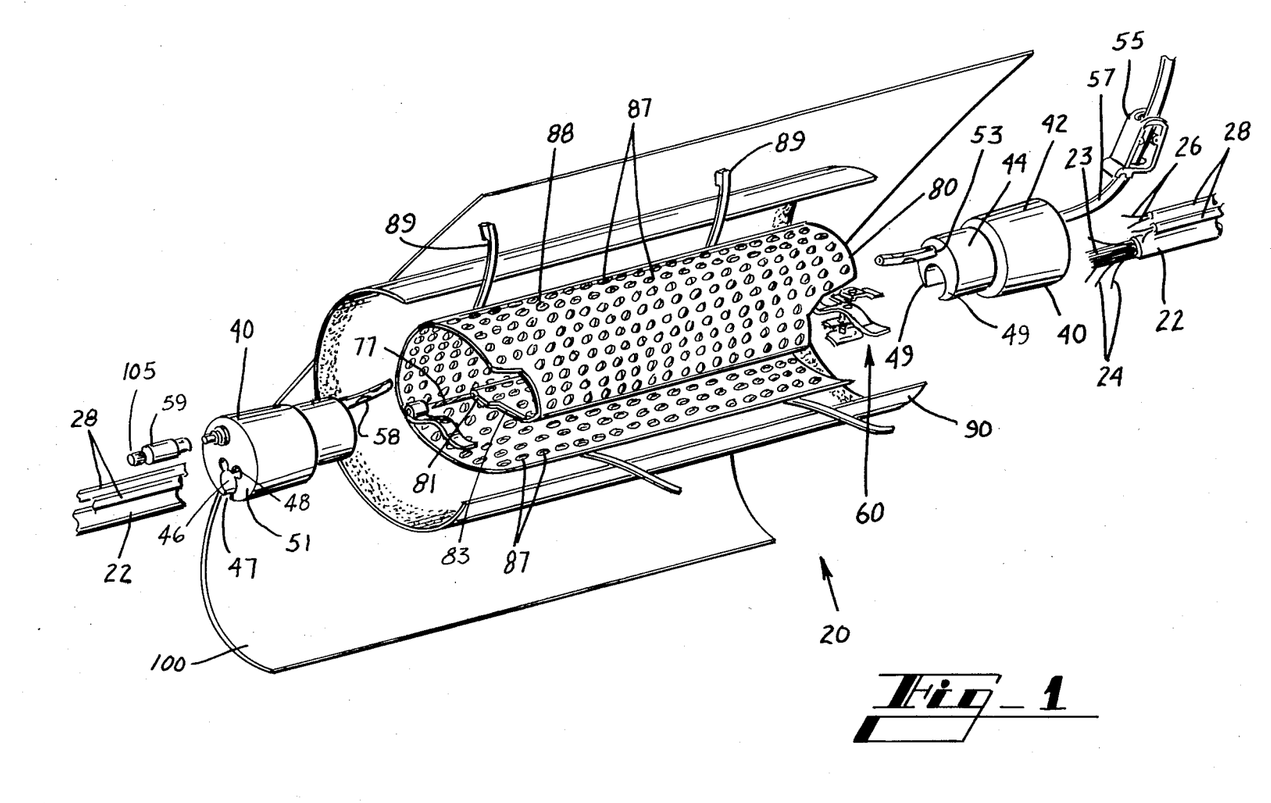
FIG. 1 is an overall exploded perspective view of a closure of the invention.

Referring now to FIG. 1, there is shown an exploded view of a closure, which is designated generally by the numeral 20, for enclosing a portion of a distribution cable 22. The cable 22 includes a core 23 comprising conductors 24—24 which are to be spliced to conductors 26—26 of service cables 28—28.

Figures 2, 3:
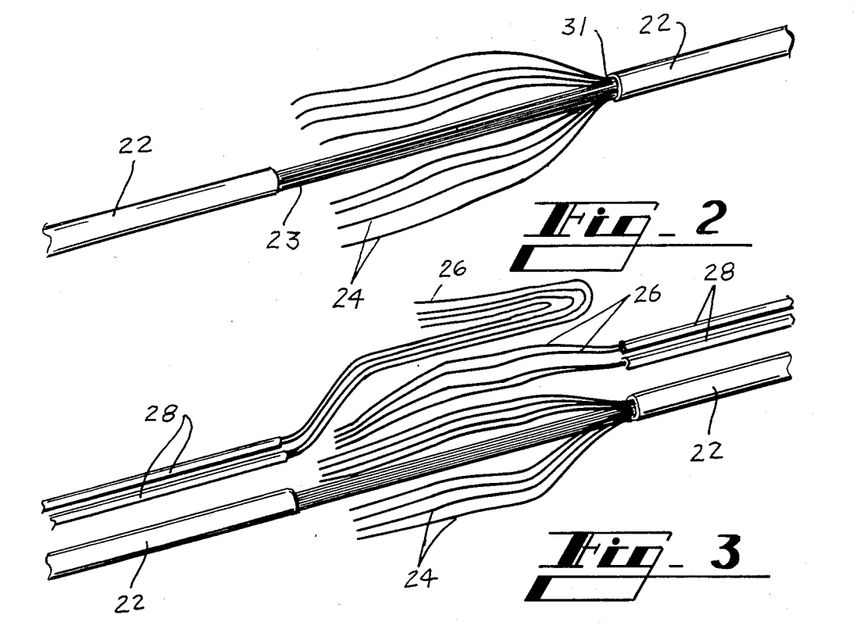
FIG. 2 is a perspective view of a distribution cable having a portion of its core exposed for splicing.
FIG. 3 is a perspective view of the cable of FIG. 2 together with service cables to be spliced thereto.

The service cables 28—28 extend service from the cable 22 to customers' premises. As can be seen in FIG. 2, a sheath system 31 of the cable 22, comprising a metallic shield 33 (see FIG. 5) and a plastic jacket 35, is removed from a portion of its length to expose the conductors 24—24 of the cable. Such a location occurs along a length of distribution cable whereat it is desired to provide access for runs to customers' premises. At the uncovered portion of the distribution cable 22, the conductors 26—26 of the service cables 28—28 (see FIGS. 1 and 3) are spliced to conductors 24—24 of the distribution cable and run to the customers' premises.

Figures 4, 5, 13:
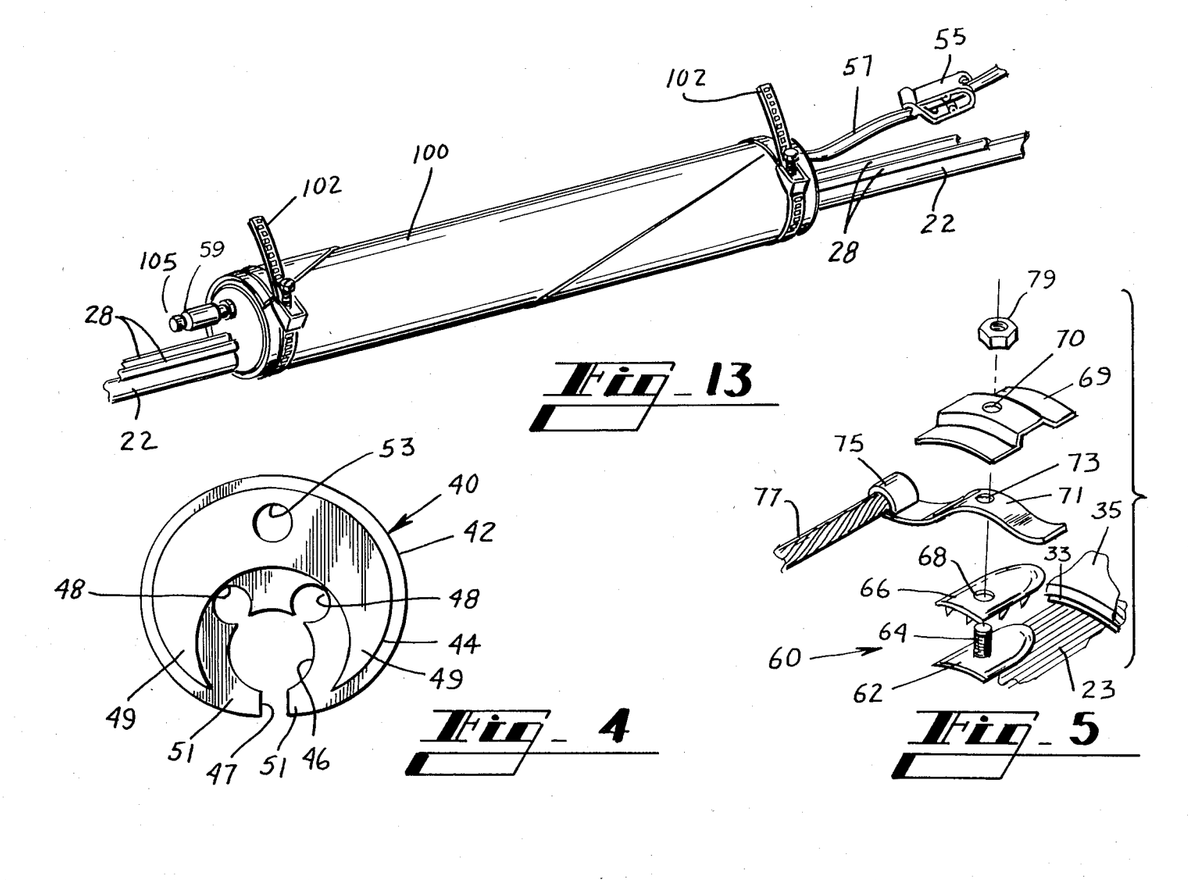
FIG. 4 is an end view of an end block of the closure.
FIG. 5 is an exploded perspective view to show a bonding clamp positioned for attachment to the distribution cable adjacent to the exposed core portion thereof.
FIG. 13 is a perspective view of the closure after the cover has been wrapped about the bladder.

Viewing again FIG. 1, it can be seen that the closure includes a pair of spaced end blocks 40—40 (see also FIG. 4). The end blocks 40—40 are made of a polyvinyl chloride material having a relatively high amount of plasticizer, for example. Each end block 40 generally has a stepped configuration with a large diameter cylindrical portion 42 and a small diameter partially cylindrical portion 44. The large diameter portion 42 includes a longitudinally extending passageway 46 which opens to the periphery thereof through a slot 47 and which is adapted to accommodate the distribution cable 22. Communicating with the passageway 46 are two smaller longitudinally extending passageways 48—48 each of which is adapted to receive a service cable 28. Inasmuch as the passageway 46 opens to the periphery of the end block 40 through the slot 47, walls 51—51 which define it are capable of being flexed to allow the end block to be moved laterally over the cable. Further, this allows the passageway 46 to be capable of adapting a range of cable sizes and reduces inventory of many different size closures. The portion 44 of each end block 40 includes arcuately shaped depending portions 49—49 (see FIGS. 1 and 4).

Also extending through each end block 40 is another passageway 53. For one end block 40, a length of flexible tubing 57 extends through its passageway 53 into the closure. A clamp 55 is attached to the end of the flexible tubing 57 which is outside the closure. For the other end block 40, a valve 59 which vents air is pressed into the outermost portion of its passageway 53. In the alternative, the valve 59 may be disposed along a length of tubing (not shown) which extends outwardly from the end block 40. A short length 58 of flexible tubing is pressed into the remaining portion of the passageway 53 and extends into the closure to direct air into the valve 59. This arrangement facilitates the introduction of a suitable encapsulant into the closure 20 at a pressure which causes it to fill interstices among the conductors and between other portions of the closure. After a suitable amount of encapsulant has been introduced, the clamp 55 is closed.

An encapsulant which is suitable for the closure 20 is one which is identified as D-1000 encapsulant. This encapsulant which is available commercially from AT&T Technologies, Inc. is adapted to block the flow of moisture and is one which cures within a predetermined time. It is a curable, liquid material which comprises a polyurethane composition and which upon curing is reenterable.

Figures 6, 9:
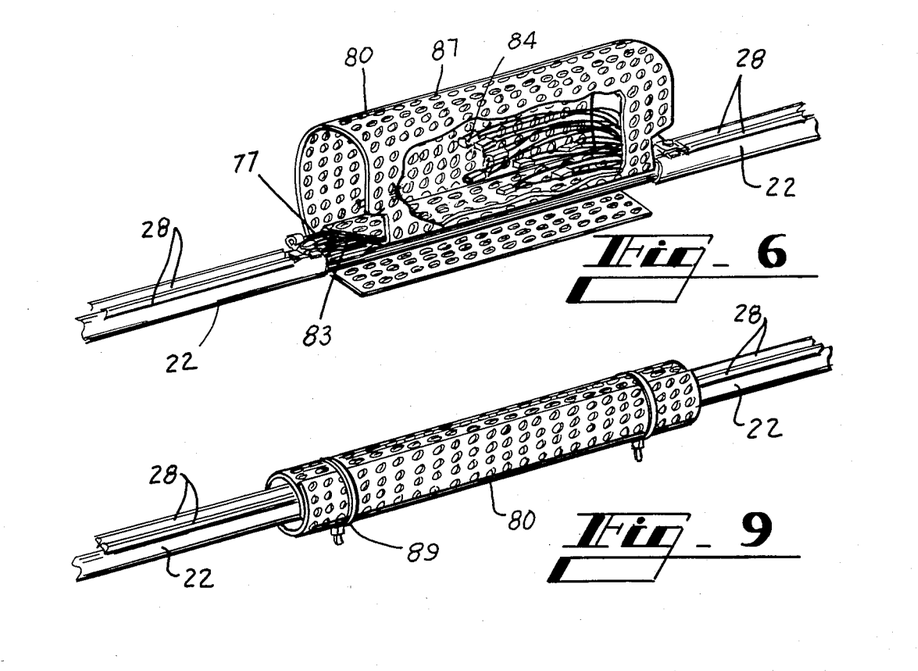
FIG. 6 is a perspective view of the distribution cable and service cables of FIG. 3 spliced together and arranged within an organizer.
FIG. 9 is a perspective view of the organizer after it has been wrapped about the spliced conductors and exposed portion of the distribution cable core.
Figure 7:
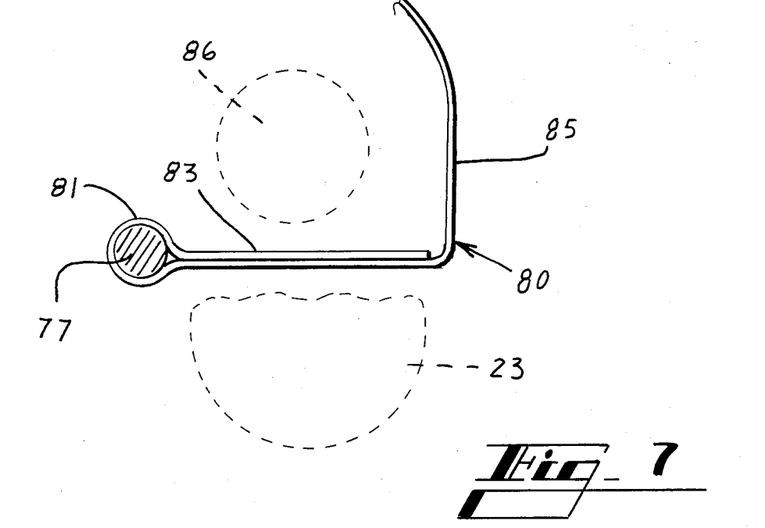
FIG. 7 is an enlarged view of the distribution cable core and spliced conductors in end view after the organizer has been moved pivotally in position to separate the splice connections from the core of the distribution cable.
Figure 8:
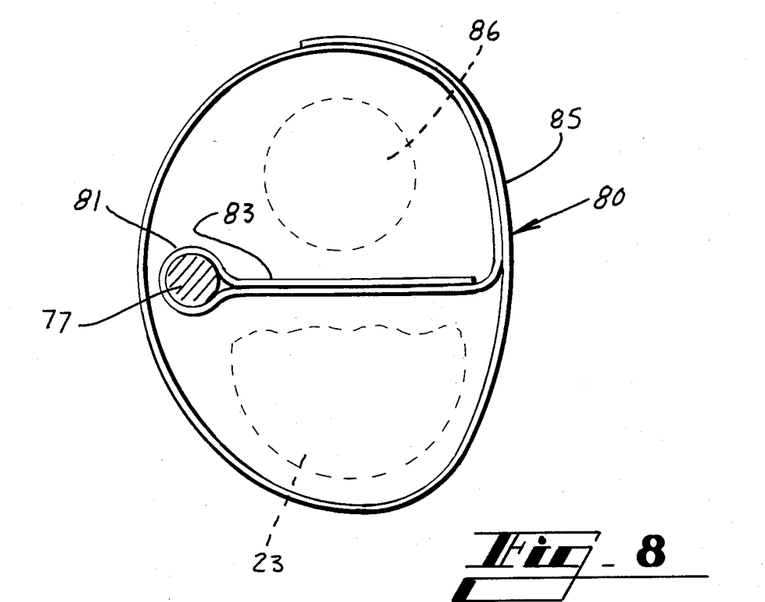
FIG. 8 is an enlarged view of the distribution cable core and the splice connections in end view after the organizer has been moved pivotally into a fixed position and wrapped about the spliced conductors and cable core.

After the cable 22 has been moved into the passageways 46—46 of the end blocks 40—40 and the sheath system therebetween removed, a bonding device or clamp 60 (see FIG. 5) is assembled to the cable at each end of the exposed portion of the core 23. An inner plate 62 of the bonding clamp is moved between the metallic shield 33 of the cable 22 and the cable core 23. In some instances, a slot is formed in the sheath system to allow a threaded stud 64 upstanding from the inner plate 62 to extend outwardly through the slot. An intermediate plate 66 having tines adapted to penetrate the cable jacket to contact the shield and an opening 68 therethrough is engaged with the cable jacket 35 such that the stud 64 extends past the peripheral edge thereof or through the opening therein. Another arcuately formed plate 71 having an opening 73 therethrough and being referred to as a strap plate is positioned over the stud 64. The plate 71 includes an outboard ferrule 75 which is adapted to receive an end portion of a bonding wire 77 which extends lengthwise of the cable 22 across the exposed portion of the core 23. The bonding wire 77 is adapted to carry electrical continuity across the splice from one bonding clamp to another. An outer plate 69 having an opening 70 therethrough for receiving the stud 64 is positioned over the plate 71. Service cables 28—28 are disposed between the outer plate 69 and the strap plate 71 (see FIG. 6).

Service cables 28—28 which extend through the passageways 48—48 in the adjacent end block 40 are clamped between the strap plate 71 and the outer plate 69. The outer plate 69 is held in clamped relation to the service cables 28—28 by a nut 79 which is turned onto the stud 64. The end portions of the service cables 28—28 which are clamped between the plates 71 and 69 are prepared for electrical engagement with the plates by removing their plastic jackets to expose a metallic shield. As can be surmised, the bonding wire 77 carries electrical continuity across the splice between the shields of the service cables to the shields of the distribution cable 22 whereafter stray currents, for example, are carried to ground.

A bonding wire 77 is secured to a ferrule 75 of one of the strap plates 71—71 by crimping and then the bonding wire is caused to be extended through an eyelet portion 81 of an organizer 80 (see FIGS. 1, 6, 7 and 8). The other end of the bonding wire 77 is received and crimped in the ferrule 75 of the strap plate 71 at the other end of the organizer. The ferrule walls are caused to be crimped about the ends of the bonding wire 77 to enhance the electrical and mechanical connection between the clamp 71 and the bonding wire.

The organizer 80 which is shown in FIGS. 1 and 6-8 is made of a polyester copolymer material which has suitable mechanical properties, which is capable of being heat-set in a configuration and which bonds to the encapsulant. The organizer 80 is performed to include a tray portion 83 and an arcuate portion 85 which is destined to be wrapped about the spliced conductors and about the core 23 of the distribution cable 22. The tray 83 is destined to extend generally along a longitudinal axis of the closure 20. At this time, the organizer 80 is rotated about the bonding wire 77 to clear the splicing area. Then an installer selects conductors 24—24 of the cable 22 and causes them to be spliced to associated conductors 26—26 of the service cables 28—28.

The installer then rotates the oganizer 80 to enclose the splice, being careful to insure that the spliced conductors, portions of conductors 24—24 and 26—26, and connectors 84—84 (see FIG. 6) are disposed in one zone, which is designated 86, of the tray 83 (see FIGS. 7-8) and the cable core 23 and the remaining portions of the conductors 24—24 and 26—26 on the other side of the tray. As can be seen by comparing FIGS. 3 and 6, end portions of two of the service cables 28—28 are retroflexed. With the organizer 80 in position, the retroflexed end portions of those two service cables, end portions of the severed conductors of the distribution cable 22 are caused to be disposed on an upper side of the tray 83 of the zone 86. As a result, the organizer 80 separates the closure 20 into three zones. One zone includes the cable core 23 and portions of conductors 24—24 and 26—26 and another, the zone 86, includes the splice connections and adjacent portions of conductors 24—24 and 26—26. The third zone includes the bonding wire 77.

The separation of the closure 20 into three zones is advantageous from the standpoint of providing moisture protection for the sensitive zone 86 of the closure wherein the splice connections are located. It has been determined that splice connections experience problems when moisture travels along the distribution cable core 23 into the closure to attack the splice connections. Because of the organizer 80, the core 23 along which the water may travel is isolated from the sensitive zone 86 of the splice connections. Further, as will be seen, the closure 20 is filled with an encapsulant under pressure. As a result, the moisture is caused to remain outside of the closure. However, should pressure be reduced, water may travel along the core into a zone of the closure where there is little incentive to travel farther.

The organizer 80 is well adapted to allow an encapsulant which is introduced into the closure 20 to be distributed throughout. To this end, the organizer 80 is provided with a plurality of openings 87—87 (see FIGS. 1 and 6) to allow the encapsulant to be moved outwardly from the line of introduction. Further, the organizer 80 is provided with a plurality of dimple-like projections 88—88 about some of the openings 87—87 to maintain the organizer spaced apart from other elements of the closure 20. This allows the encapsulant to become disposed between the elements further to insure the absence of voids along which moisture may travel. The organizer 80 is secured in position about the splice and the core 23 by cable ties 89—89 (see FIGS. 1 and 9).

Figures 10, 11:
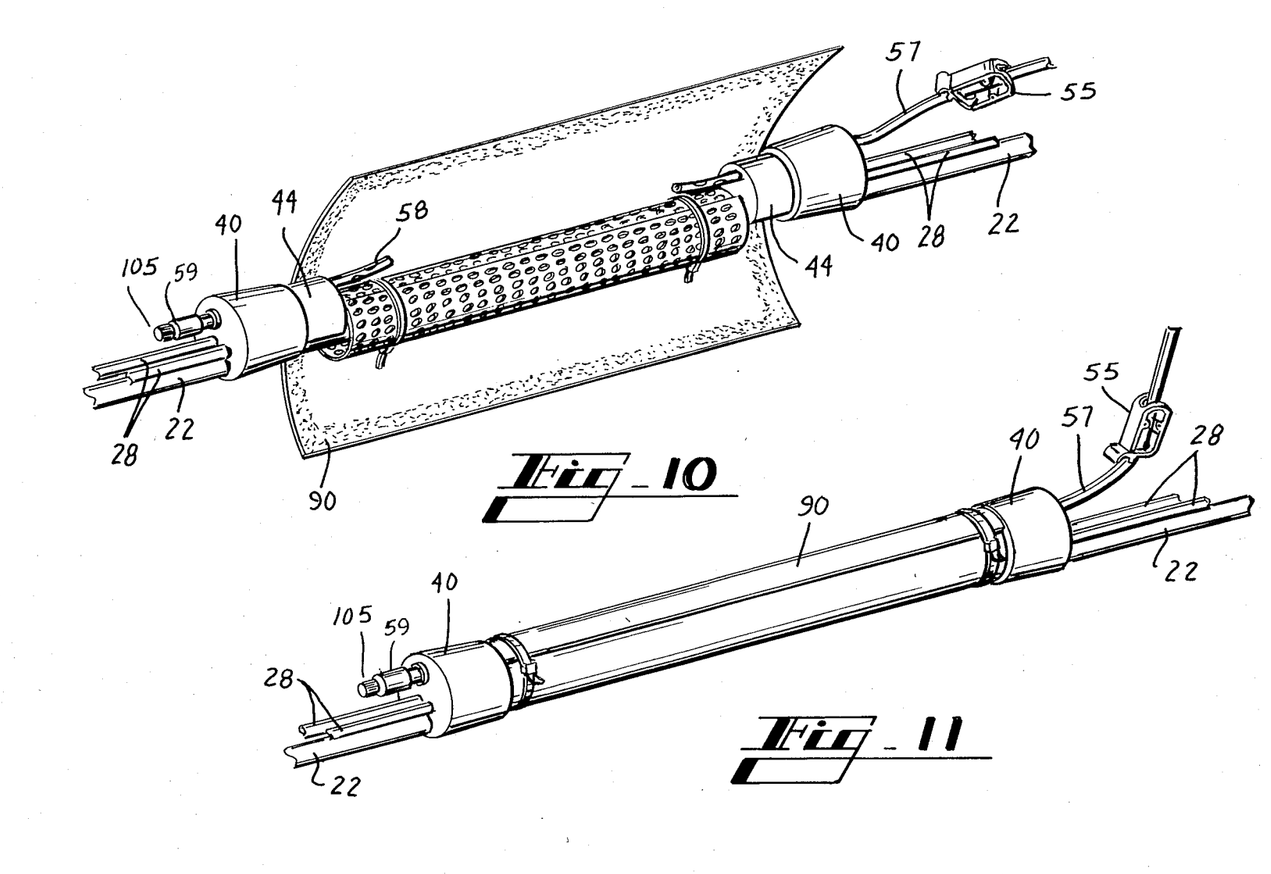
FIG. 10 is a perspective view which shows an organizer in position about a cable splice and a bladder to be wrapped about the organizer.
FIG. 11 is a persepctive view which shows the bladder after it has been wrapped about the organizer over small diameter portions of spaced end blocks and secured with cable ties.

Covering the organizer 80 is a relatively supple membrane-like member 90 which is referred to as a bladder (see FIGS. 10-11). The bladder 90 is adapted to be wrapped about the small diameter end portion 44 of each of the end blocks 40—40 and to enclose the organizer 80 between the end blocks. The bladder 90 is made of a plastic material such as polyurethane and is adapted to contain the encapsulant which is introduced into the closure. The projections 88—88 are effective to maintain the organizer 80 spaced from the bladder 90 to allow encapsulant to become disposed therebetween.

The bladder 90 is enclosed in a shell or cover 100 (see FIG. 12) which extends over the large diameter portions 42—42 of the end blocks 40—40 (see FIGS. 1 and 13). The cover 100, which comprises a plastic material such as polypropylene, is manufactured and cut to shape so that it is adapted to be wrapped helically about the bladder 90. Adjustable clamps 102—102 are disposed about the cover 100 where the cover engages the larger diameter portions 42—42 of the end blocks (see FIG. 13). When encapsulant is introduced into the closure, the bladder 90 expands outwardly until it engages compliantly the cover after which the pressure in the encapsulant in the closure increases. Typically, the pressure in the encapsulant is increased to a value which exceeds about 10 psi. Advantageously because of the helical wrapping of the cover, it is adapted to enclose a range of end block sizes which are selected in accordance with the size of the distribution cable.

As the pressure in the closure 20 increases, the helical wraps of the cover 100 tighten up to strengthen the closure. The cover 100 locks together to form a rigid cylinder which provides mechanical strength properties for the closure 20. Further, the cover 100 causes the end blocks 40—40 to lock to the cables extending therethrough. As a result, the closure 20 and its splice connections are protected against displacements caused by cable twisting, pullout or bending.

It should be clear that the end blocks 40—40 establish the geometry of the closure and provide for a constant closure diameter over a range of distribution cable sizes and number of splice connections. Further, it is unnecessary for a craftsperson to locate properly the organizer 80, the bladder 90 and the cover 100 once the bonding hardware and organizer have been installed.

Figures 12, 14, 15:
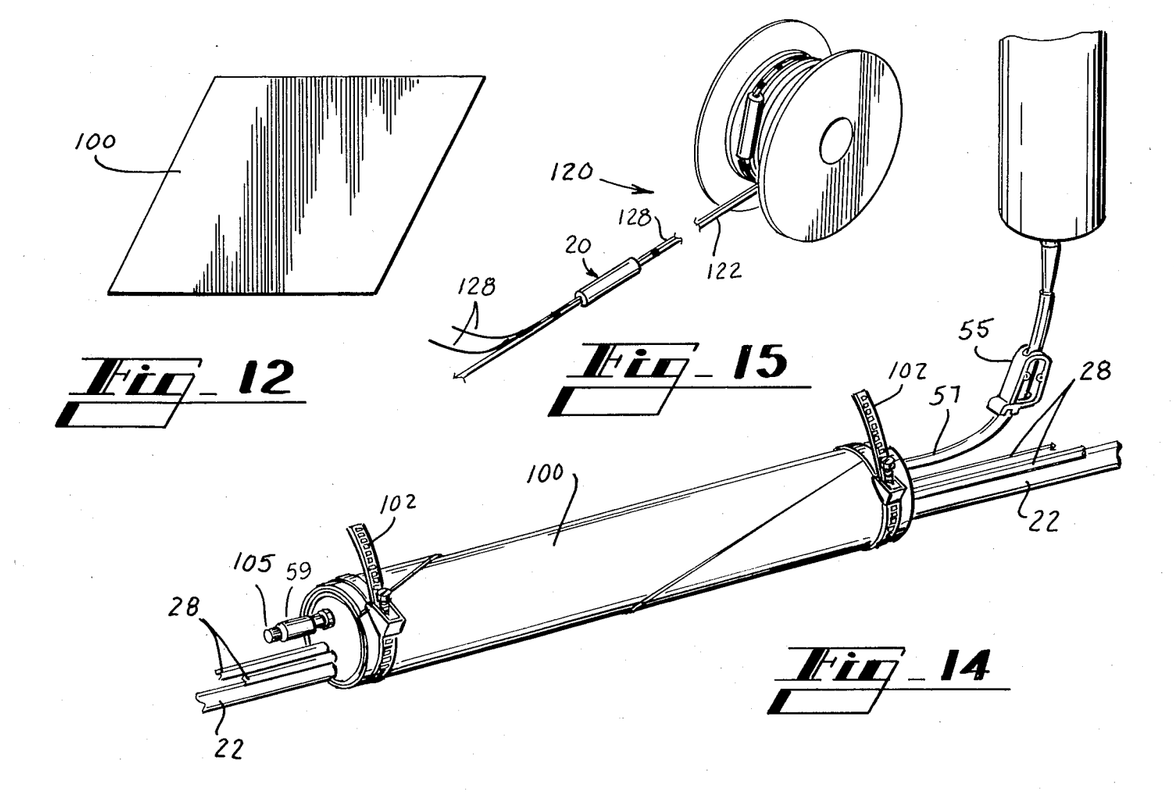
FIG. 12 shows a plan view of a sheet of material which is to be wrapped helically about the bladder to provide a cover.
FIG. 14 is a perspective view of the closure as an encapsulant is being introduced into the splice area by a hand pump.
FIG. 15 is a perspective view of a pre-terminated cable system which includes at least one closure of this invention.

After the closure 20 has been assembled from the kit of parts described hereinabove and about an exposed portion of the core 23 of the distribution cable 22, the installer connects a container of the liquid encapsulant to the tubbe 57 in the one end block 40 (see FIG. 14). Encapsulant is caused to be moved through the tube 57 into the space within the organizer 80. The encapsulant is caused to flow through the openings 87—87 in the organizer into engagement with the bladder 90.

Air in the closure 20 is moved to one end thereof and caused to be evacuated through the escape valve 59 in the other end bock 40. The air in the closure is vented through the tube 58 which extends from the end block opposite to the one through which the encapsulant is introduced. The end portion of the tube 58 is perforated to ensure evacuation and is positioned near the top of the internal cavity of the closure to allow escape of the air until the closure is filled with liquid encapsulant.

As more encapsulant is introduced through the tube 57, the bladder 90 expands outwardly and engages the inner wall of the cover 100. Then as the introduction of encapsulant continues, the pressure therein increases to cause it to fill the interstices among the conductors 24—24 and between elements of the closure. Portions of the encapsulant are flowed a distance into the sheathed cable core adjacent to the closure 20.

Advantageously, the closure 20 includes provisions for ascertaining that it has been filled properly. The closure 20 includes a pressure indicator 105 adapted to extend outwardly at such time that the closure has been filled and the pressure therein is at least a predetermined value. The clamp 55 is closed to hold the encapsulant within the closure under pressure to allow the encapsulant to cure. The encapsulant cures and establishes compressively loaded gaskets at the entrance portions of the core 23 into the closure and to the conductors within the closure. As a result, entrance of moisture into the zone designated 86 is precluded.

Another feature of the closure relates to the end blocks 40—40. Inasmuch as the number of service cables 28—28 to be spliced into the cable 22 may not be determined in advance, each end block 40 is provided with passageways having specially made dowels (not shown) received therein. The installer removes dowels to accommodate the number of service cables desired, which number has an upper limit.

Furthermore, the closure may be provided with a magnetic locator (not shown) which is disposed in one of the end blocks 40—40. This device is used by operating telephone companies to assist in locating these closures when installed underground.

In an alternative method of installing the closure from the kit of parts, the sheath system is removed from a length of the distribution cable 22 and bonding clamps are attached to the sheath ends adjacent to the exposed core. Then service cables 28—28 are secured to the bonding clamps and a bonding wire extended between ferrules 75—75 of the bonding clamps. The organizer 80 is caused to be mounted pivotally on the bonding wire and swung into position after conductors of the service cables have been spliced to conductors of the distribution cable. Afterwards, the end blocks 40—40 are positioned over the distribution and service cables and the bladder 90 and cover 100 installed. As should be clear, the end blocks 40—40 can be installed initially or after the grounding system and organizer 80 are in place.

The closure 20 of this invention is capable of being used to provide a cable system 120 which is referred to as a pre-terminated cable. The system 120 as shown in FIG. 15 includes a distribution cable 122 which includes a metallic shield and jacket and which at predetermined locations along its length has the shield and jacket removed to expose the core. These locations are determined so that when the cable is installed in the field, they will correspond to those locations where service cables are to extend to customers' premises.

At each predetermined location of this factory prepared system, bonding clamps are connected to the shield at each end of the exposed core and a bonding wire 77 is extended along the exposed core and connected electrically to the clamps. Then at least one service cable 128 is brought into each location, and its shield connected electrically to one of the bond clamps with conductors of the cable extending into juxtaposition with the exposed core.

An organizer 80 is mounted on the bonding wire 70 and after conductors of the distribution cable have been spliced to conductors of the service cable, the organizer is disposed to separate the exposed core from the spliced conductor portions. Then a bladder 90 is disposed about the organizer and secured to end blocks 40—40 which are positioned over the distribution cable and service cable or cables. Afterwards, a cover 100 is wrapped helically about the bladder and clamped to the end blocks 40—40 and encapsulant is introduced into the closure.

The clamping of the cover 100 causes the end blocks 40—40 to lock mechanically to the distribution and service cables. The curing of the encapsulant while under pressure causes the helically wrapped cover and the end blocks to lock together as a rigid cylinder. Because of the rigidity of the resulting structure, the cured encapsulant is not disturbed when the cable system 120 is shipped and installed.

It should be understood that the above-described arrangements are simply illustrative of the invention. Other arrangements may be devised by those skilled in the art which will embody the principles of the invention and fall within the scope and spirit thereof.

What is claimed is:

1. A closure, which comprises:
   first and second end blocks being spaced apart and each having an opening therethrough, each said opening adapted to have a cable having a diameter in a predetermined range extending therethrough into the closure where conductors of cores of the cables are spliced together to provide connections therebetween;
   organizing means disposed between said end blocks and having a portion adapted to be disposed between the connections and conductor portions of at least one cable core for isolating the connections and conductor portions adjacent to the connections from conductor portions of the at least one cable core and for enclosing separately the connections and adjacent conductor portions in one zone and the conductor portions of the at least one cable core in another zone; and
   means for enclosing said organizing means and portions of said end blocks and for containing an encapsulant which is introduced into said closure.

2. The closure of claim 1, wherein each of said end blocks includes an opening therethrough which communicates with a peripheral surface of the end block and which is defined by walls which are capable of flexing to accommodate a range of cable sizes and said means for eclosing said organizing means and portions of said end blocks includes:
   a bladder which encloses said organizing means and portions of said end blocks and which is adapted to contain a curable liquid encapsulant that is introduced into said closure, said bladder comprising a relatively supple material; and
   a cover which encloses said bladder and which provides surfaces against which said bladder is expanded when an encapsulant is introduced into said closure.

3. The closure of claim 2, which includes means for introducing an encapsulant into the closure, the encapsulant being flowed into said bladder and filling interstices between the cable conductors, and among the conductors and the cables and said bladder until air is evacuated from the closure and the closure becomes pressurized to a predetermined level.

4. The closure of claim 2, wherein said cover is wrapped helically about said bladder for causing said end blocks to become engaged tightly about the cables.

5. The closure of claim 2, wherein said portion of said organizing means includes a diametrical portion which includes a loop that is destined to become disposed about a bonding wire which extends across an exposed portion of a core of a distribution cable to provide electrical continuity across sheathed portions of the distribution cable which are separated by the exposed core and to allow said organizing means to be moved pivotally.

6. The closure of claim 5, wherein said organizing means separates said closure into three zones, one adapted to receive the splice connections, one adapted to receive the exposed core of the distribution cable and one adapted to receive the bonding wire.

7. A closure, which comprises:
   first and second end blocks being spaced apart and adapted to have cables extending therethrough into the closure where conductors of cores of the cables are spliced together to provide connections therebetween;
   organizing means disposed between said end blocks and having a portion adapted to be disposed between the connections and conductor portions of at least one cable core for isolating the connections and conductor portions adjacent to the connections from conductor portions of the at least one cable core and for enclosing separately the connections and adjacent conductor portions in one zone and the conductor portions of the at least one cable core in another zone; and means for enclosing said organizing means and portions of said end blocks and for containing an encapsulant which is introduced into said closure, said means for enclosing said organizing means and portions of said end blocks comprising:

a bladder which encloses said organizing means and portions of said end blocks and which is adapted to contain a curable liquid encapsulant that is introduced into said closure, said bladder comprising a relatively supple material; and a cover which encloses said bladder and which provides surfaces against which said bladder is expanded when the encapsulant is introduced into said closure;

wherein each of said end blocks has a stepped generally cylindrical configuration having large and small diameter portions and said bladder is disposed about small diameter portions of said end blocks, each of said end blocks including a passageway through the large diameter portion thereof for allowing a distribution cable to extend therethrough and at least one other passageway for allowing a service cable which is to be spliced to the distribution cable to extend therethrough.

8. The closure of claim 7, wherein said cover is disposed about the large diameter portions of said end blocks.

9. A kit of component parts which are capable of being assembled to provide a closure for a cable splice in which insulated conductors of one cable are spliced to associated conductors of another cable to provide connections therebetween, said kit comprising:

first and second end blocks each having an opening extending therethrough with each opening adapted to have a cable portion of a cable having a diameter in a predetermined range extending therethrough;

organizing means adapted to be disposed between said end blocks and having a portion adapted to be disposed between the connections and conductor portions of at least one cable core for isolating the connections and adjacent conductor portions from conductor portions of the at least one cable core and for enclosing separately the connections and adjacent conductor portions in one zone and the conductor portions of the at least one cable core in another zone; and means for enclosing said organizing means and portions of said end blocks to contain an encapsulant which is introduced into said enclosing means.

10. The kit of parts of claim 9, wherein the opening of each of said end blocks communicates with an outer surface of the end block and is defined by walls which are capable of being flexed to accommodate any of a range of cable sizes, said enclosing means includes:

a bladder which is adapted to enclose said organizing means and portions of said end blocks when said end blocks are spaced apart and which is adapted to contain a curable, liquid encapsulant which is introduced into said bladder when it is wrapped about said organizing means, said bladder being made of a relatively supple material; and a cover which is adapted to be disposed about said bladder and portions of said end blocks when said end blocks are spaced apart.

11. The kit of parts of claim 10, which also includes a curable, liquid encapsulant which is capable of being introduced through one of said end blocks to fill interstices among the conductors and among the conductors and cable and said bladder.

12. The kit of parts of claim 10, which also includes means for introducing an encapsulant into a closure, the closure when completed adapted to be pressurized with the encapsulant filling interstices between the cable conductors, and among the conductors and the cable and said bladder.

13. The kit of parts of claim 10, wherein said cover is adapted to be wrapped helically about said bladder.

14. A kit of component parts which are capable of being assembled to provide a closure for a cable splice in which insulated conductors of one cable are spliced to associated conductors of another cable to provide connections therebetween, said kit comprising:

first and second end blocks each adapted to have a cable portion extending therethrough;

organizing means adapted to be disposed between said end blocks and having a portion adapted to be disposed between the connections and conductor portions of at least one cable core for isolating the connections and adjacent conductor portions from conductor portions of the at least one cable core and for enclosing separately the connections and adjacent conductor portions in one zone and the conductor portions of the at least one cable core in another zone; and means for enclosing said organizing means and portions of said end blocks to contain an encapsulant which is introduced into said enclosing means, said means for enclosing said organizing means and portions of said end blocks including;

a bladder which is adapted to enclose said organizing means and portions of said end blocks when said end blocks are spaced apart and which is adapted to contain a curable, liquid encapsulant which is introduced into said bladder when it is wrapped about said organizing means, said bladder being made of a relatively supple material, wherein each of said end blocks has a stepped, generally cylindrical, configuration having large and small diameter portions and said bladder is adapted to be disposed about small diameter end portions of said end blocks, each of said end blocks including a passageway through the large diameter portion thereof for allowing a distribution cable to extend therethrough and at least one other passageway for allowing a service cable which is to be spliced to the distribution cable to extend therethrough; and a cover which is adapted to be disposed about said bladder and portions of said end blocks when said end blocks are spaced apart.

15. The kit of parts of claim 14, wherein said cover is adapted to be disposed about large diameter portions of said end blocks.

16. The kit of parts of claim 14, wherein said portion of said organizing means includes a diametrical portion which includes a loop that is destined to become disposed about a bonding wire which extends across on exposed portion of a core of a distribution cable which extends through the closure to allow said organizing means to be swung pivotally, the conductors of the exposed core of teh distribution cable to be spliced to conductors of at least one service cable which is adapted to extend through one of said end blocks.

17. The kit of parts of claim 16, wherein said organizing means separates said closure into three zones, one adapted to receive the splice connections, one adapted to receive the distribution cable core, and one adapted to receive the bonding wire.

18. The kit of parts of claim 17, wherein said organizing means is provided with a plurality of openings to permit encapsulant which is introduced thereinto to flow outwardly into engagement with said bladder.

19. The kit of parts of claim 19, wherein said organizer also includes a plurality of projections which become oriented outwardly when the organizer is wrapped about the spliced conductors, the projections being effective to maintain said organizer spaced from said bladder to allow encapsulant to become disposed therebetween.

20. The kit of parts of claim 16, which is adapted to enclose conductors of a distribution cable which extends through the closure and which are spliced to conductors of a service cable, said kit also including a pair of bonding clamps, the distribution cable including a metallic shield and a jacket which are removed from a portion of length of the distribution cable to expose the core of the distribution cable and wherein each of said bonding clamps is adapted to be connected electrically to the shield of the distribution cable at one end of the exposed core and is adapted to establish electrical contact with the service cable having conductors to be spliced to conductors of the distribution cable, and wherein a bonding wire is adapted to be connected to each of the bonding clamps to carry electrical continuity across the closure and said organizing means includes a looped portion through which the bonding wire is adapted to extend, the organizing means adapted to be turned pivotally on the bonding wire to allow the organizer to become disposed suitably about the exposed distribution cable core and about the spliced portions of the conductors.

21. A cable system which includes:
   a length of a distribution cable which includes a core, a metallic shield which encloses said core and a jacket which encloses said shield, said length of cable having said shield and said jacket removed from spaced portions thereof;
   a bonding clamp which is connected electrically to said metallic shield of said distribution cable adjacent to each end of each said spaced portion;
   a bonding wire which is connected electrically to each pair of said bonding clamps associated with each of said spaced portions;
   at least one length of a service cable which is attached to one of the bonding clamps at each of the spaced portions, the service cable having conductors which are spliced to conductors of the distribution cable;
   an end block having passageways extending therethrough and positioned over the distribution cable and any service cable at each end of each of the spaced portions;
   an organizer which is mounted on said bonding wire and which separates the conductor portions of the service cable which are spliced to the conductor portions of the distribution cable from the unspliced conductor portions of the distribution cable;
   a bladder which encloses said organizer and which is secured to portions of the end blocks at each spaced portion; and
   a cover which is wrapped about said bladder at each spaced portion and which is secured to said end blocks at that spaced portion.

22. The cable system of claim 21, which also includes means for introducing a curable liquid encapsulant through one of said end blocks at each said spaced portion and for determining when said system at each said spaced portion has been filled substantially.

23. The system of claim 21, wherein said cover is wrapped helically about said bladder and secured thereto to cause said end blocks to become locked to the cables extending therethrough to prevent substantially movement of the cables relative to the encapsulant at each of the spaced portions.

24. A method of providing an enclosed splice between conductors of a distribution cable and conductors of at least one service cable, said method including the steps of:
   removing a metallic shield and a jacket from a length of a distribution cable to expose a core comprising a plurality of conductors;
   providing electrical continuity across the exposed core by causing a bonding clamp to be connected electrically to the shield of the distribution cable at each end of the exposed core and by connecting a metallic bonding wire between the clamps;
   positioning an organizer to be disposed along the length of the distribution cable from which the shield and jacket have been removed and mounting the organizer for pivotal movement on the metallic wire;
   causing unspliced conductors of the distribution cable to be disposed on one side of a central portion of the organizer and the portions of the conductors of the distribution cable and service cables which are to be spliced together on another side of the organizer;
   splicing conductors of the distribution and service cables to establish electrical connections therebetween;
   positioning on end block having an enlarged portion and passageways therethrough for the distribution and service cables over the cables adjacent to each end of the organizer;
   enclosing the organizer with a bladder and securing the bladder at each of its ends to the end blocks;
   enclosing the bladder with a cover and securing the cover to the enlarged portions of the end blocks; and
   introducing a curable liquid encapsulant into the bladder and causing the encapsulant to be flowed into interstices among the conductors and elements of the closure.

25. The method of claim 24, wherein the liquid encapsulant is flowed into the closure to expel air therefrom and is caused to expand the bladder until the closure is pressurized to a predetermined level.

26. The method of claim 24, wherein the cover is wrapped helically about the bladder.

27. The method of claim 24, wherein the end blocks are positioned over the cables prior to the organizer being positioned.

* * * * *